United States Patent Office 2,768,289
Patented Oct. 23, 1956

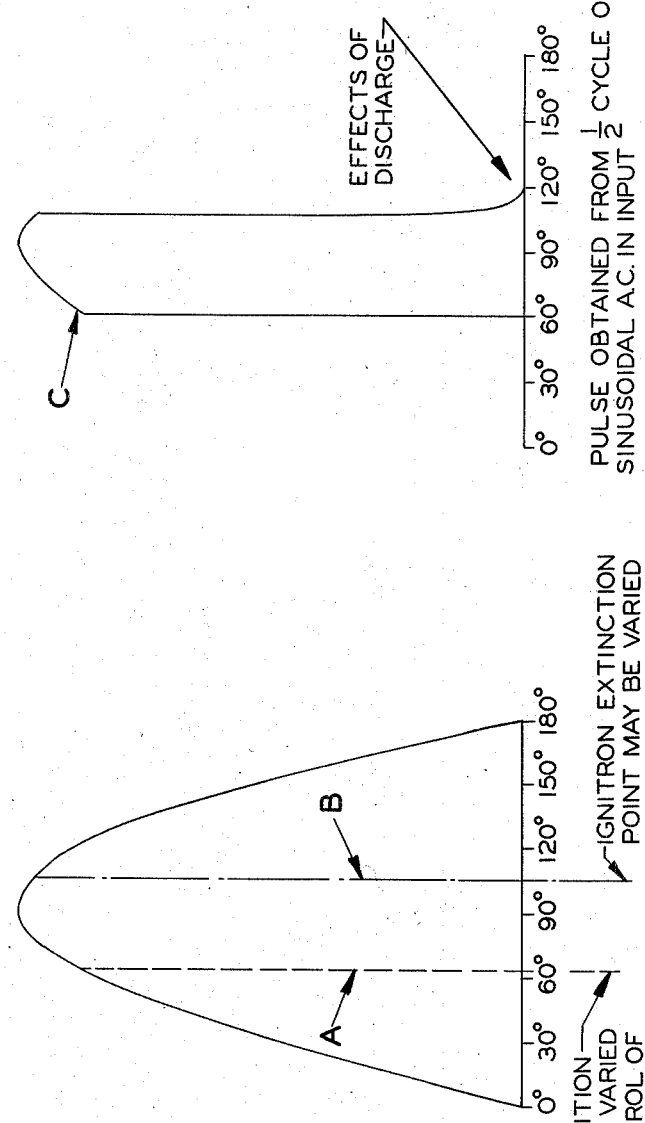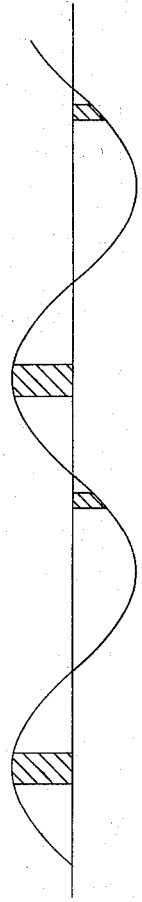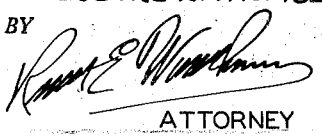

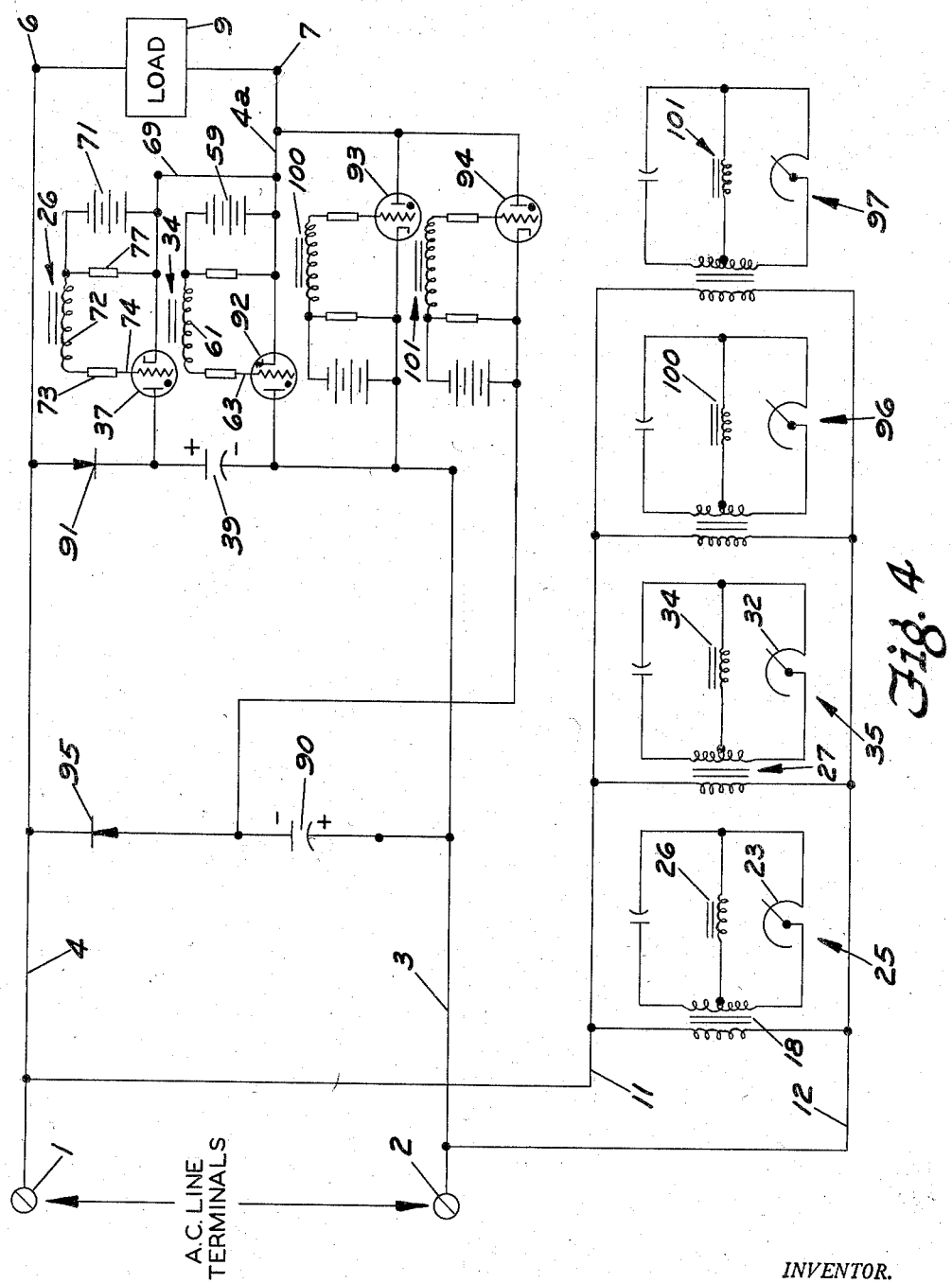

2,768,289
PULSE GENERATOR

Theodore R. Thomsen, Farmington, Mich., assignor to Robotron Corporation, Detroit, Mich., a corporation of Michigan Application July 31, 1952, Serial No. 302,020

11 Claims. (Cl. 250—27)

This invention relates to an electrical circuit for generating pulses from an alternating current supply and particularly to a circuit wherein both the beginning point and the ending point of the pulse may be located as desired with respect to the sinusoidal wave of the alternating current supply.

In present electrical practice, means are well known for initiating the flow of current at any desired point in the sinusoidal wave of an alternating current supply. However, the characteristics of the thyratrons or the ignitrons which are normally used in such circuits are such that when flow of current is once started it will continue until the potential across the principal electrodes thereof is extinguished. Thus, when a flow of current is started in any given portoin of a sinusoidal wave, such flow will continue to the end of that particular wave form.

In a number of electrical applications this creates a certain amount of difficulty for a more precise control over the energy input in a given system could be obtained if the pulse could be terminated at a selected point prior to the end of a given wave form and thus provide control over both the beginning and the ending of said pulse rather than having control over only the point of beginning thereof.

Accordingly, a principal object of the invention is to provide a circuit generating from an alternating current supply a series of pulses wherein both the beginning and the ending of said pulses may be located within a single half-wave and at predetermined points with respect to the wave form of the alternating current supply.

A further object of the invention is to provide such a method which may be carried out by a relatively simple apparatus.

A further object of the invention is to provide apparatus, as aforesaid, which will carry out said method and will do so without the necessity of relays or other mechanically moving parts.

A further object of the invention is to provide a device, as aforesaid, wherein the point of beginning of each of said pulses with respect to the wave forms of an alternating potential may be freely selected over a wide range and under a simple control.

A further object of the invention is to provide a device, as aforesaid, in which the point of ending of each of said pulses with respect to the wave forms of an alternating potential may be freely selected over a wide range and under a simple control.

A further object of the invention is to provide a device, as aforesaid, in which the pulses may all be in a single direction.

A further object of the invention is to provide a device, as aforesaid, wherein the pulses may occur in both directions from an alternating current source without loss in accuracy in control over said pulses.

A further object of the invention is to provide a device, as aforesaid, in which the control over the ending of said pulses will be sufficiently precise and positive that there will be no danger of a circuit accidentally resuming conduction after a pulse has been terminated.

Other objects and purposes of the invention will be apparent to persons acquainted with equipment of this general type upon reading the following disclosure and inspection of the accompanying drawings.

In the drawings:

Figure 2 illustrates the beginning and ending of a pulse in relation to the wave form of the alternating current supply.

Figure 3 illustrates the shape of a typical pulse.

Figure 4 is a circuit diagram of a modified apparatus by which pulses may be generated from both halves of a wave form but in which each pulse starts and ends intermediate the points of zero potential on said wave form.

Figure 5 represents the pulses which may be obtained by one particular setting of the apparatus shown in Figure 4.

*General description*

Figure 1:
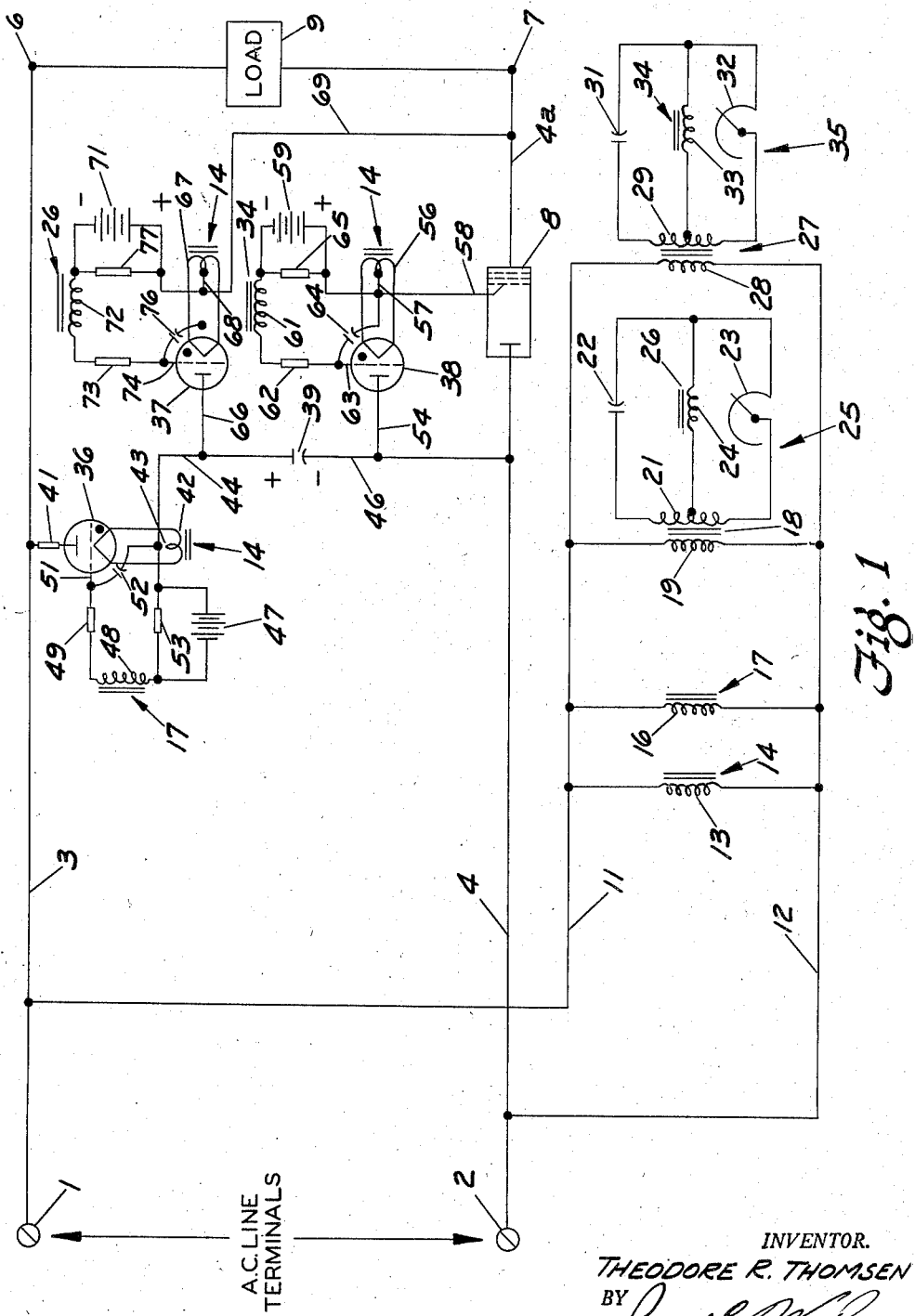
Figure 1 represents a circuit diagram illustrating a preferred apparatus by which uni-directional pulses may be generated from an alternating current supply.

In general, my invention contemplates two space-discharge devices containing an ionizable material therein, as thyratrons, and a capacitor, all connected to control the conduction and non-conduction of a further similar space-discharge device, as an ignitron. Assuming that the ignitron is arranged to conduct positive pulses, a rectifier is arranged to charge said capacitor on opposite pulses. A thyratron is arranged with a phase shift circuit to initiate conduction of said ignitron at a selected point on the positive wave form. A further thyratron is arranged in series with said capacitor and in series with the principal electrodes of said ignitron in such a manner that upon its becoming conductive in response to another phase shift circuit connected to its grid, said capacitor may discharge through it and place an extinguishing potential onto said ignitron and hold same long enough to insure complete de-ionization of said ignitron. By suitable control of the respective phase shift circuits, the beginning of conduction of an ignitron, and the ending of conduction thereof, may each be independently, but accurately, controlled as desired.

*Detailed description*

Turning now to the drawings in more detail, there are provided terminals 1 and 2 which are connectable to any suitable source of an alternating potential. From these terminals extend first and second line conductors 3 and 4 which energize terminals 6 and 7 through an ignitron 8. From said terminals 6 and 7 a load 9 may be energized in a conventional manner. The bus line 11 is connected to the first line conductor 3 and a second bus line 12 is connected to the second line conductor 4. The primary winding 13 of a transformer 14 is connected between the bus lines 11 and 12 and the primary winding 16 of a transformer 17 is also connected between said bus lines 11 and 12. The purpose of said two transformers will appear hereinafter.

A further transformer 18 is connected by its primary winding 19 between said bus lines 11 and 12 and its secondary winding 21 is connected to an adjustable phase shift circuit 25 having a capacitor 22, a potentiometer 23 and the primary winding 24 of a peaking transformer 26, said primary winding 24 being connected to a center tap on the secondary winding 21 and to a point between the potentiometer 23 and the capacitor 22.

A further transformer 27 is connected by its primary winding 28 to said bus lines 11 and 12 and is connected by its secondary winding 29 to a second phase shift circuit 35 of conventional type, here including a capacitor 31, a potentiometer 32 and the primary winding 33 of a peaking transformer 34, which primary winding is connected to a center tap on the secondary winding 29 and to a point between the potentiometer 32 and the capacitor 31.

The space-discharge device network in this specific embodiment includes a first thyratron 36, a second thyratron 37, a third thyratron 38 and a capacitor 39, together with suitable connecting means for effecting the operations desired.

With respect first to the thyratron 36, it is connected through a protective resistance 41 by its anode through the first line conductor 3. Its cathode is connected to the secondary winding 42 of the transformer 14 and a conductor 43 center tapped to the said secondary winding 42 is connected by the conductor 44 to one side of the capacitor 39. The other side of said capacitor is connected by the conductor 46 to the second line conductor 4. A source of grid biasing potential, as a battery 47, is connected at one end to the conductor 43 and at its other end is connected to the secondary winding 48 of the transformer 17 through a protective resistance 49 to the grid 51 of the thyratron 36. The capacitor 52 and the protective resistance 53 may be used or not as desired to control the operational characteristics of the thyratron 36 in accordance with well known principles.

The thyratron 38 is connected by its anode through the conductor 54 to the line conductor 4, here by being connected to a point on the conductor 46 between the capacitor 39 and the line conductor 4. Its cathode is connected to a further secondary winding 56 of the transformer 14 and a conductor 57 center tapped to said secondary winding 56 is connected to the ignitor 58 of the ignitron 8. A source of grid biasing potential, as a battery 59, is connected at its one end to the conductor 57 and thereby to the cathode of the thyratron 38 and is connected at its other end through the secondary winding 61 of the peak transformer 34 through a protective resistance 62 to the grid 63 of said thyratron 38. Capacitor 64 and protective resistance 65 may be used if desired to control the operational characteristics of the thyratron.

The thyratron 37, utilized for discharging the capacitor 39, is connected by its anode through a conductor 66 to the opposite side of the capacitor 39 from that which is connected to the line conductor 4. Its cathode is connected to another secondary winding 67 of the transformer 14 and a conductor 68, center tapped to said secondary winding 67, is connected to a conductor 69 which in turn is connected to the cathode of the ignitron 8 here by being connected to that portion 4a of the line conductor 4 which extends from the cathode of the ignitron 8 to the load terminal 7. A source of grid biasing potential, as a battery 71, is connected at its one end to said conductor 68 and thereby to the cathode of the thyratron 37 and is connected at its other end to the secondary winding 72 of the peaking transformer 26 and thence through a protective resistance 73 to the grid 74 of the thyratron 37. The capacitor 76 and the protective resistance 77 may be used if desired to control the operational characteristics of the thyratron in a conventional manner.

Operation

With alternating current pulses of the usual sinusoidal wave form being supplied in a conventional manner to the line terminals 1 and 2, the line conductors 3 and 4 and the bus conductors 11 and 12 will be energized by pulses of similar wave form in the usual manner. The phase shift circuits 25 and 35 will function in the usual manner and the magnitude of phase shift at the peaking transformers 26 and 34 respectively, will be determined by the value of resistance placed into the circuit by the potentiometers 23 and 32, respectively.

Turning now to the portion of the circuit controlling the ignitron 8, the grid of the thyratron 36 is normally biased with a sufficiently high negative voltage to hold same non-conductive until said bias is overcome by a positive pulse acting through the transformer 17. Thus, in the half cycle when the line conductor 3 is positive, the thyratron 36 will conduct and charge the capacitor 39. The characteristics of the parts are so chosen that said capacitor 39 will become fully charged in one half cycle and in actual practice the charging period is usually about one fourth cycle.

In the next half cycle, the line conductor 4 becomes positive and the positive potential appears on the anodes of both the ignitron 8 and the thyratron 38. The thyratron 38 is blocked, however, by the negative bias placed on its grid 63 by the battery 59 and remains blocked until said grid receives a positive pulse, overcoming said negative bias, from the peaking transformer 34 in response to the phase shift circuit 35. By the adjustment of the potentiometer 32, said pulse, which may be termed an initiating pulse, will cause the thyratron to commence conduction and thereby to conduct current through the ignitor 58. Thus, the conduction of current through the ignitron 8 is initiated. In Figure 2 the point of commencement of conduction is indicated by the line A, here shown to occur 60 degrees behind the beginning of the positive pulse in the line conductor 4.

In the meantime, the charge on the capacitor 39 has been holding a positive potential on the anode of the extinguishing thyratron 37. Conduction of said thyratron is, however, blocked by the negative bias on its grid originating in the battery 71. At a point determined by the setting of the potentiometer 23, the phase shift circuit 25 will cause a positive pulse to be applied to the peaking transformer 26 and thereby applied to the grid 74 overcoming the negative bias thereon and permitting conduction of the extinguishing thyratron 37. When such conduction occurs, the capacitor 39 will be permitted to discharge and thereby a high potential will be discharged through said thyratron. This will act through the conductors 68, 69 and 4a to place a high potential onto the ignitron 8 which potential is of opposite polarity to that originating in the line terminals 1 and 2. This will cancel the potential causing said ignitron to conduct and thereby terminate such conduction. Thus, assuming that the phase shift circuit 25 is so adjusted that it will deliver a pulse through the peak transformer 26 at 105 degrees following the beginning of the positive pulse in the line conductor 4, the point of ending of conduction through the ignitron is shown by the broken line B in Figure 2. Thus, the actual pulse delivered through the load 9 is shown by line C in Figure 3. The curved portion at the rightward extremity of said line C occurs because of the discharge of capacitor 39 through the load 9.

It will be recognized of course that this beginning of the pulse at 60 degrees and the ending thereof at 105 degrees is for illustrative purposes only and that the points of beginning and ending of said pulses may be anywhere within the wave form as desired according to the settings of the respective phase shift circuits 25 and 35.

The capacity of the capacitor 39 must, in the light of the foregoing, obviously be sufficient to reverse the potential on the ignitron 8 for a sufficient period of time to allow it to de-ionize completely, normally about 1 millisecond, after which the reimposition of positive potential on its anode will not re-initiate conduction. Likewise, the negative potenial maintained on the grid of the ignitron firing tube 38, the peak of the wave form to which the peaking transformer 34 responds having passed, prevents conduction through said firing tube 38 to reenergize the initiator 58. Thus, the ignitron 8 will remain non-conductive until the positive pulse of the next cycle.

The next cycle, namely, the appearance of a positive pulse on the line conductor 3, will again charge the capacitor 39 and the cycle above described will be repeated.

It will thus be appreciated that there will be delivered to the load a series of uni-directional pulses having both their beginning points and their ending points at preselected positions on the wave form and the objects and purposes above enumerated together with others related and incident thereto, will accordingly be accomplished.

While the above described circuit has assumed that only uni-directional pulses are desired, it will be recognized that the circuit may also be duplicated in reverse direction to provide both positive and negative pulses each having their respective beginning points and ending points at desired locations in the respective positive and negative wave forms.

Figure 4 illustrates a circuit by which this may be accomplished. It will be recognized that a substantial portion of the circuit is the same as that shown in Figure 1 although in the interest of brevity some details appearing in Figure 1 are omitted from Figure 3. The portions which are identical to that shown in Figure 1 are illustrated with the same numerals as those shown in Figure 1 and hence the description of the corresponding parts of Figure 1 will serve to describe these parts of Figure 4 equally well, excepting that in Figure 4 the thyratron 36 is replaced by a generalized showing of a rectifier at 91 and the ignitron 8 is here replaced by a thyratron 92.

In this circuit there are added two further thyratrons, namely, thyratrons 93 and 94. A rectifier and the capacitor 90 are connected in series intermediate the line conductors 3 and 4. Thyratron 93 is connected in parallel with the thyratron 92 and in reverse polarity. The thyratron 94 is connected by its anode to the cathode of the thyratron 92 and by its cathode to a point intermediate the rectifier 95 and the capacitor 90.

The phase shift circuits 96 and 97 are provided to render the grids of the thyratrons 94 and 93 conductive in the same manner as above described for the grids of the thyratron 92 and the thyratron 37. It will be appreciated that the phase shift circuits 96 and 97 can be the same as the phase shift circuits 25 and 35 but will be understood that the maximum degree of flexibility will be obtained if each of the circuits are independent of the others.

Accordingly, a negative pulse will charge the capacitor 39 by conduction through the rectifier 91. The next following positive pulse will pass through the thyratron 92 at a predetermined time according to the setting of the phase shift circuit 35. At a later point in the wave form, the thyratron 37 will conduct, thereby placing the charge of the previously charged capacitor 39 in reverse polarity across the principal electrodes of the thyratron 92, thereby extinguishing said thyratron 92 and substantially instantly terminating the positive pulse through said load 9.

When line 2 is positive, conduction will be through the rectifier 95 to charge the capacitor 90. The following half cycle will pass through the thyratron 93 at a point on the wave form determined by the setting of the phase shift circuit 96. At a subsequent point in the same wave form, as determined by the setting of the phase shift circuit 97, the thyratron 94 becomes conductive and thereby places the charge of the capacitor 90 across the terminals of the thyratron 93 in reverse polarity with respect thereto and extinguishes conduction through said thyratron 93. Thus, the pulses above described may be alternately provided on both wave forms of an alternating current and, as appearing in Figure 5, the negative wave is not necessarily of the same magnitude or duration as the positive pulses.

While the specific embodiment of the invention has been selected for illustrative purposes, it will be understood that numerous variations may be made from particular details herein shown and such variations will be included within the scope of the hereinafter appended claims excepting as said claims may by their own terms expressly limit otherwise.

I claim:

1. In a pulse generator, the combination comprising: a pair of terminals connectable to a source of alternating current; means including an ignitron for connecting said terminals to a load; means rendering said ignitron conductive during positive half cycles applied thereto; a capacitor; a rectifier connected in series with said capacitor and conductors connecting said rectifier and said capacitor to said terminals, said rectifier being so arranged as to be conductive during negative half cycles and the characteristics of said parts being such that said capacitor will become charged during one negative half cycle; a firing network rendering said ignitron conductive during positive half cycles; an extinguishing network, including a thyratron and blocking means normally holding said thyratron non-conductive, connecting said capacitor to the principal electrodes of said ignitron, said connecting being of such polarity that when said extinguishing network becomes conductive said capacitor will place a potential onto said ignitron opposite to that which renders said ignitron conductive, and said extinguishing network including also means overcoming said blocking means at a preselected point with respect to a positive half cycle for rendering said thyratron conductive.

2. In a pulse generator, the combination comprising: a pair of terminals connectable to a source of alternating current; means including an ignitron for connecting said terminals to a load; means rendering said ignitron conductive during positive half cycles applied thereto; a capacitor; a rectifier connected in series with said capacitor and conductors connecting said rectifier and said capacitor to said terminals, said rectifier being so arranged as to be conductive during negative half cycles and the characteristics of said parts being such that said capacitor will become charged during one negative half cycles; a firing network rendering said ignitron conductive during positive half cycles; an extinguishing network, including a thyratron and blocking means normally holding said thyratron non-conductive, connecting said capacitor to the principal electrodes of said ignitron, said connecting being of such polarity that when said extinguishing network becomes conductive said capacitor will place a potential onto said ignitron opposite to that which renders said ignitron conductive, and said extinguishing network including also means including a phase shifting circuit overcoming said blocking means at a preselected point with respect to a positive half cycle for rendering said thyratron conductive.

3. In a pulse generator, the combination comprising: a pair of terminals connectable to a source of alternating current; means including an ignitron for connecting said terminals to a load; means rendering said ignitron conductive during positive half cycles applied thereto; a capacitor; a rectifier connected in series with said capacitor and conductors connecting said rectifier and said capacitor to said terminals, said rectifier being so arranged as to be conductive during negative half cycles and the characteristics of said parts being such that said capacitor will become charged during one negative half cycle; a firing network rendering said ignitron conductive during positive half cycles, said firing network including a first normally non-conductive thyratron and a phase-shift circuit for rendering said first thyratron conductive at a selected point on the wave form; an extinguishing network, including a second thyratron and blocking means normally holding said second thyratron non-conductive, connecting said capacitor to the principal electrodes of said ignitron, said connecting being of such polarity that when said extinguishing network becomes conductive said capacitor will place a potential onto said ignitron opposite to that which renders said ignitron conductive, and said extinguishing network including also means overcoming said blocking means at a preselected point with respect to a positive half cycle for rendering said second thyratron conductive.

4. In a pulse generator, the combination comprising: a pair of power terminals connectable to a source of alternating current; a first conductor connectable to a load; an ignitron, a second conductor connected through said ignitron and connectable to the other side of said load; a first phase shift circuit energized from said first and second line conductors; a first peaking transformer energized by said first phase shift circuit; a second phase shift circuit energized from said line conductors; a second peaking transformer energized from said second phase shift circuit; a capacitor; a conductor connecting one side of said capacitor to said second line conductor; a rectifier and conductors connecting the other side of said capacitor through said rectifier to the said first line conductor; a network including a first thyratron connecting the igniter of said ignitron to the anode thereof, said network including means normally holding said first thyratron non-conductive and means responsive to energization of said second peaking transformer to render said first thyratron conductive; a second thyratron and means normally holding said second thyratron non-conductive; a conductor connecting the anode of said second thyratron to the side of said capacitor opposite to that side which is connected to the second line conductor and other means connecting the cathode thereof to the cathode of said ignitron; and means responsive to energization of said first peaking transformer rendering said second thyratron conductive.

5. In a pulse generator, the combination comprising: a pair of power terminals connectable to a source of alternating current; a first conductor connectable to a load; a space-discharge device having an ionizable material therein and an ignitor for ionizing said ionizable material; a second conductor connected through said space-discharge device and connectable to the other side of said load; a first phase shift circuit energized from said first and second line conductors; a second phase shift circuit energized from said line conductors; a capacitor; a conductor connecting one side of said capacitor to said second line conductor; a rectifier and conductors connecting the other side of said capacitor through said rectifier to the said first line conductor; a network including a first thyratron connecting the igniter of said space discharge device to the anode thereof, said network including means normally holding said first thyratron non-conductive and means responsive to said first phase shift circuit to render said first thyratron conductive; a second thyratron and means normally holding said second thyratron non-conductive; a conductor connecting the anode of said second thyratron to the side of said capacitor opposite to that side which is connected to the second line conductor and other means connecting the cathode of said second thyratron to the cathode of said ignitron; and means responsive to said second phase shift circuit for rendering said second thyratron conductive.

6. In a pulse generator, the combination comprising: a pair of terminals connectible to a source of alternating current; means including a space discharge device having an ionizable material therein and an igniter for ionizing said ionizable material for connecting said terminals to a load; means rendering said space discharge device conductive during positive half cycles applied thereto; an electric storage device; a rectifier connected in series with said electric storage device and conductors connecting said rectifier and said electric storage device to said terminals, said rectifier being so arranged as to be conductive during negative half cycles and the characteristics of said parts being such that said electric storage device will become charged during one negative half cycle; a firing network rendering said space discharge device conductive during positive half cycles; an extinguishing network and blocking means normally holding said extinguishing network non-conductive, connecting said electric storage device to the principal electrodes of said space discharge device, said connecting being of such polarity that when said extinguishing network becomes conductive said electric storage device will place a potential onto said space discharge device opposite to that which renders said space discharge device conductive, and said extinguishing network including also means overcoming said blocking means at a preselected point with respect to a positive half cycle for rendering said extinguishing network conductive.

7. In a pulse generator, the combination comprising: a pair of power terminals connectible to a source of alternating current and means including an ignitron for connecting said terminals to a load; a firing network rendering said ignitron conductive during positive half cycles; a capacitor and a one way electric valve connected in series with said capacitor and conductors connecting said one way electric valve and said capacitor to said terminals, said one way electric valve being so arranged as to be conductive during negative half cycles and the characteristics of said parts being such that said capacitor will become charged during one negative half cycle; a firing network rendering said ignitron conductive during positive half cycles; an extinguishing network connecting said capacitor to the principal electrodes of said ignitron in reverse polarity with respect to that effecting conduction therethrough, said extinguishing network being normally non-conductive and means rendering said extinguishing network conductive at a selected point in a given positive half cycle following initiation of conduction by said firing network.

8. In a pulse generator, the combination comprising: a pair of power terminals connectible to a source of alternating current; a first line conductor connectible to one side of a load; a space discharge device having an ionizable material therein and an igniter for ionizing said ionizable material; a second line conductor connected through said space discharge device and connectible to the other side of said load; a first phase shift circuit and means energizing said phase shift circuit simultaneously with said first and second line conductors; a second phase shift circuit and means energizing said phase shift circuit simultaneously with said line conductors; a capacitor; a conductor connecting one side of said capacitor to said second line conductor; a rectifier and conductors connecting the other side of said capacitor through said rectifier to the said first line conductor; a network including a first thyratron connecting the igniter of said space discharge device to the anode of said space discharge device, said network including means normally holding said first thyratron non-conductive and means responsive to said first phase shift circuit to render said first thyratron conductive; a second thyratron and means normally holding said second thyratron non-conductive; a conductor connecting the anode of said second thyratron to the side of said capacitor opposite to that side which is connected to the second line conductor and other means connecting the cathode thereof to the cathode of said space discharge device; and means responsive to said second phase shift circuit for rendering said second thyratron conductive.

9. In a pulse generator, the combination comprising: a pair of terminals connectible to a source of alternating current; means including a space discharge device having an ionizable material therein and an igniter for ionizing said ionizable material for connecting said terminals to a load; means rendering said space discharge device conductive during positive half cycles applied thereto; a capacitor; a rectifier connected in series with said capacitor and conductors connecting said rectifier and said capacitor to said terminals, said rectifier being so arranged as to be conductive during negative half cycles and the characteristics of said parts being such that said capacitor will become charged during one negative half cycle; a firing network rendering said space discharge device conductive during positive half cycles; an extinguishing network, including a thyratron and blocking means normally holding said thyratron non-conductive, connecting said capacitor to the principal electrodes of said space discharge device, said connecting being of such polarity that when said extinguishing network becomes conductive said capacitor will place a potential onto said space discharge device opposite to that which renders said space discharge device conductive, and said extinguishing network including also means overcoming said blocking means at a preselected point with respect to a positive half cycle for rendering said thyratron conductive.

10. In a pulse generator, the combination comprising: a pair of terminals connectible to a source of alternating current; means including a space discharge device having an ionizable material therein and igniter for ionizing said ionizable material for connecting said terminals to a load; means rendering said space discharge device conductive during positive half cycles applied thereto; an electric storage device; a rectifier connected in series with said electric storage device and conductors connecting said rectifier and said electric storage device to said terminals, said rectifier being so arranged as to be conductive during negative half cycles and the characteristics of said parts being such that said electric storage device will become charged during one negative half cycle; a firing network rendering said space discharge device conductive during positive half cycles; an extinguishing network, including a thyratron and blocking means normally holding said thyratron non-conductive, connecting said electric storage device to the principal electrodes of said space discharge device, said connecting being of such polarity that when said extinguishing network becomes conductive said electric storage device will place a potential onto said space discharge device opposite to that which renders said space discharge device conductive, and said extinguishing network including also means overcoming said blocking means at a preselected point with respect to a positive half cycle for rendering said thyratron conductive.

11. In a pulse generator, the combination comprising: a pair of terminals connectible to a source of alternating current; means including a space discharge device for connecting said terminals to a load; means rendering said space discharge device conductive during positive half cycles applied thereto; an electric storage device; a one way electric valve connected in series with said electric storage device and conductors connecting said one way electric valve and said electric storage device to said terminals, said one way electric valve being so arranged as to be conductive during negative half cycles and the characteristics of said parts being such that said electric storage device will become charged during one negative half cycle; a firing network rendering said space discharge device conductive during positive half cycles; an extinguishing network, including a thyratron and blocking means normally holding said thyratron non-conductive, connecting said electric storage device to the principal electrodes of said space discharge device, said connecting being of such polarity that when said extinguishing network becomes conductive said electric storage device will place a potential onto said space discharge device opposite to that which renders said space discharge device conductive, and said extinguishing network including also means overcoming said blocking means at a preselected point with respect to a positive half cycle for rendering said thyratron conductive.

References Cited in the file of this patent
UNITED STATES PATENTS

| | | |
|---|---|---|
| 1,691,395 | Langmuir | Nov. 13, 1928 |
| 2,006,737 | Gessford | July 2, 1935 |
| 2,008,730 | Smede | July 23, 1935 |
| 2,147,472 | Ulrey | Feb. 14, 1939 |
| 2,202,720 | Spielhagen | May 28, 1940 |
| 2,280,949 | Hall | Apr. 28, 1942 |